United States Patent
Turner et al.

(10) Patent No.: US 9,832,679 B2
(45) Date of Patent: *Nov. 28, 2017

(54) WINDOW REGULATOR FOR IMPROVED PERFORMANCE IN A COMMUNICATIONS NETWORK

(71) Applicant: Citrix Systems, Inc., Fort Lauderdale, FL (US)

(72) Inventors: William M. Turner, Higganum, CT (US); John Donohue, Southbury, CT (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 259 days.

This patent is subject to a terminal disclaimer.

(21) Appl. No.: 14/734,468

(22) Filed: Jun. 9, 2015

(65) Prior Publication Data

US 2015/0282002 A1    Oct. 1, 2015

Related U.S. Application Data

(63) Continuation of application No. 13/404,655, filed on Feb. 24, 2012, now Pat. No. 9,059,934.

(51) Int. Cl.
*H04W 28/02* (2009.01)
*H04L 12/807* (2013.01)
*H04L 12/835* (2013.01)

(52) U.S. Cl.
CPC ........ *H04W 28/0273* (2013.01); *H04L 47/27* (2013.01); *H04L 47/30* (2013.01)

(58) Field of Classification Search
None
See application file for complete search history.

(56) References Cited

U.S. PATENT DOCUMENTS 8,553,550 B2   10/2013   Shiotsuki et al.
8,724,475 B2    5/2014   Prescott et al.
(Continued)

FOREIGN PATENT DOCUMENTS

EP        2530898 A1     12/2012
WO    WO 02/33909 A1      4/2002

OTHER PUBLICATIONS

Aweya, James et al.; "TCP rate control with dynamic buffer sharing," Computer Communications, vol. 25: 922-943 (2002).

(Continued)

*Primary Examiner* — Benjamin Lamont

(57) ABSTRACT

A window regulator for improving the performance of communications networks is described. In a communications network, data is sent downstream from a sender to a receiver, and acknowledgements are sent back upstream. When data is received at the receiver, the data is placed in a buffer and an acknowledgement of receipt may be sent. If no acknowledgement is received by a sender after a certain period of time, the sender retransmits the data. The receiver communicates how much data the receiver is willing to receive at any given time by sending an advertised window to the sender. The window regulator sets the size of the advertised window based on measurements of capacity in the network to improve the amount and rate of data sent downstream while avoiding loss of data and subsequent retransmissions.

22 Claims, 6 Drawing Sheets

(56) References Cited

U.S. PATENT DOCUMENTS

| | | |
|---|---|---|
| 9,059,934 B2 | 6/2015 | Turner et al. |
| 2002/0009072 A1 | 1/2002 | Halme |
| 2003/0179720 A1 | 9/2003 | Cuny |
| 2004/0027997 A1* | 2/2004 | Terry et al. ............. H04B 1/56 370/276 |
| 2010/0097930 A1 | 4/2010 | Racz et al. |
| 2010/0315950 A1 | 12/2010 | Venkataraman et al. |
| 2011/0116460 A1 | 5/2011 | Kovvali et al. |
| 2012/0011271 A1 | 1/2012 | Zhao et al. |
| 2012/0087260 A1 | 4/2012 | Devarapalli et al. |
| 2014/0089471 A1* | 3/2014 | Pianese et al. ..... H04L 49/9005 709/219 |
| 2014/0192639 A1 | 7/2014 | Smirnov |

OTHER PUBLICATIONS

International Search Report and Written Opinion for Aplication No. PCT/US2013/027623, 11 pages, dated Jun. 21, 2013.

\* cited by examiner

WINDOW REGULATOR FOR IMPROVED PERFORMANCE IN A COMMUNICATIONS NETWORK

CROSS REFERENCE TO RELATED APPLICATION

This application is a continuation application of U.S. patent application Ser. No. 13/404,655 filed Feb. 24, 2012, entitled "Window Regulator for Improved Performance in a Communications Network," which is incorporated herein by reference in its entirety.

BACKGROUND

A communication network typically includes a core network and at least one access network. The core network is the central part of the communication network and serves as the backbone of the communication network. The core network generally includes high capacity switches and transmission equipment.

Each access network serves as a point of contact with the communication network for users. An access network connects subscribers with service providers. A communication network may have multiple access networks, serving different sets of users, in communication with a single core network.

Typically, a user device in an access network requests a certain piece of content, such as a web page or a file. The request for content is typically forwarded through the access network to the core network. Within the access network, a number of devices may facilitate the delivery of requests and information from a user to the core network. A user typically interacts with an access network through a base station that receives information and requests from the user device. The base station forwards information and requests through the access network towards the core network. The base station typically routes data through an intermediate service platform, such as a network controller or switch, on the way to the core network.

The content is sent back through the access network through the gateway to the intermediate service platform and the base station, which provides the content to the user device. The content is often broken into small units, such as bytes or data packets, and transmitted piece-by-piece to be reassembled at the user device.

One exemplary protocol that facilitates this data transmission process is Transmission Control Protocol (TCP). TCP was originally designed to operate in conventional wire-line networks. Such networks may be characterized as having very low error rates, fairly constant data rates, and delay which is constant or slowly varying. If data losses occur, they are generally due to congestion in the network. Similarly, delay variation is generally the result of varying fill levels in buffers at various points in the network.

Early generations of wireless access networks suffered from fairly high error rates, low (but fairly constant) data rates, and reasonably constant or slowly-varying delay. For third generation (3G) and fourth generation (4G) networks, however, lower-layer protocols have resulted in low error rates (as seen by higher-layer protocols). Partly as a result of these lower-layer improvements, packet delays in the access network can be highly variable. Adaptive rates mean that data rates can also vary greatly and quickly. As a result, the features of TCP that provide good performance in wire-line networks can result in reduced throughput, large delays, and generally-degraded user experiences in 3G and 4G broadband wireless networks.

Among other features, TCP implements a system known as the "sliding window" for ensuring that the units of data are successfully received by the user device or an intermediate platform forwarding the data to the user device (other transmission protocols also use a similar windowing system).

In a windowing system, each unit of the data is assigned a sequence number. For example, the first byte of data might be assigned sequence number 1, the second byte might be assigned sequence number 2, and so on. When the units of data are received, the receiver acknowledges to the sender that the data units were successfully transmitted, and the data units they are reassembled in the order of the sequence numbers. The sequence numbers also provide a convenient way to determine if a data unit has been lost in transmission. For example, if the sender does not receive an acknowledgement of data unit #2 in a reasonable amount of time, the sender can retransmit data unit #2. The above-described system is considered a windowing system because the receiver limits the number of data units that the receiver is willing to accept before at least some of the data units have been acknowledged (thereby creating a "window" of data that can be accepted at any given time). The limit on the number of data units is known as the window size. By limiting the window size, a protocol can effectively determine the rate at which data will be transmitted by the sender and received by the receiver. The rate may be important because of bottlenecks in the communication path between the sender and the receiver.

The transmitter may limit the number of data units that it will send before receiving an acknowledgement to a value referred to as the "congestion window". This value may be increased, as when no data is lost (as indicated by the acknowledgements), and decreased when data is dropped, so as to ensure that data is sent at a rate close to the maximum that the network will allow. The receiver may set the maximum value of the congestion window based on its ability to buffer data, to a value referred to as the "receiver window" or the "advertised window".

In one example, the data must pass through an intermediate device on the way from the sender to the receiver. Typically, the data rate of the path between this intermediate device and the receiver is the limiting factor in the transmission rate, and therefore represents a bottleneck. The intermediate device maintains a data buffer for temporarily holding the data before it is sent to the receiver, to help to match the data high data rate between the transmitter and the intermediate device, and the lower data rate between the intermediate device and the receiver. This intermediate device is referred to as a "bottleneck node." It is desirable to maintain a rate of data transmission that is low enough so that the buffer is not overwhelmed (which would cause the intermediate device to cease receiving new data, thereby causing data loss), but which is high enough to cause data to be transmitted as quickly and efficiently as possible.

SUMMARY

Exemplary embodiments of the present invention provide a window regulator that regulates the size of an advertised window of a device in a communication network. The window regulator sets the size of the advertised window based on measurements of capacity in the network, and in particular on a high-bandwidth side of a bottleneck node in the network, to improve the amount and rate of data sent downstream while avoiding loss of data and subsequent retransmissions. Exemplary embodiments may make use of traffic measurements on the high-bandwidth side of the bottleneck node to estimate, for example, data in flight on the low-bandwidth side of the bottleneck node and a capacity of a buffer in the bottleneck node. Accordingly, exemplary embodiments need not be able to directly observe the size of the buffer in the bottleneck node (making it possible to employ an ad hoc solution rather than building a window regulation capability directly into the bottleneck node). Further, exemplary embodiments avoid the need to address radio protocols used by connections between devices in the access network.

In one embodiment, a non-transitory electronic device readable storage medium is provided. The medium holds instructions that, when executed by one or more processors, cause the processors to set a size of an advertised window for a receiving electronic device that receives data from a sender in a communications network. The communications network may include a bottleneck node interacting with the network through a high-bandwidth side and a low-bandwidth side, with the data passing through the bottleneck node on the way to the receiving electronic device. The bottleneck node may be an intermediate service platform in the access network, such as a Radio Network Controller (RNC).

At least a portion of the buffer being may be assigned to the receiving electronic device, and this portion may be further subdivided into portions assigned for individual data flows for the receiving electronic device. The advertised window may be, for example, a Transmission Control Protocol (TCP) advertised window.

The instructions may include instructions for identifying a use level of the bottleneck node and at least a portion of the access network based on an observation of traffic on the high-bandwidth side of the bottleneck node. In some embodiments, the communications network may include a core network and an access network which connects one or more user devices to the core network, and the high-bandwidth side of the bottleneck node may represent a connection between the core network and the access network. The connection between the core network and the access network may be an IuPS connection. In some embodiments, the access network may be a Radio Access Network (RAN).

The instructions may further include instructions for determining an advertised window size based on the identified use level, the advertised window size representing an amount of data that the sender is permitted to transmit to the receiving electronic device at a given time. The advertised window size may further be determined based on a combination of a utilization level of the bottleneck node and a use level on the low-bandwidth side of the bottleneck node. The advertised window size may further be determined based on an overall utilization of the buffer in the bottleneck node.

The instructions may further include instructions for setting a size of the advertised window for the receiving electronic device to the determined advertised window size. The size of the advertised window may be transmitted to the sender.

The instructions may further include instructions for allocating a capacity of the buffer among the plurality of receivers based on a proportional session capacity of a data flow for each of the plurality of receivers.

In other embodiments, an electronic device-implemented method for setting a size of an advertised window in accordance with the above-described instructions.

In yet other embodiments, a system for setting a size of an advertised window is provided. The system may include a storage for storing an advertised window size representing an amount of data that the sender is permitted to transmit to the receiving electronic device at a given time. The system may further include one or more processors for setting the size of the advertised window in accordance with the above-described instructions. The system may be collocated with an RNC, or may be provided between the RNC and the core network.

Using the above-described embodiments, the advertised window size may be set so as to improve network throughput by avoiding an overflow of the buffer at the intermediate platform. Further, the available bandwidth of the access network is efficiently utilized.

Advantageously, the above-described embodiments do not rely on being able to directly observe the size of the buffer in the bottleneck node. Accordingly, exemplary embodiments can be deployed outside of the bottleneck node, and estimate the network and bottleneck capacity based on observations of network traffic, for example on the high-bandwidth side of the bottleneck node.

DETAILED DESCRIPTION

Normal TCP operation in a wireless network environment, such as a 3GPP Radio Access Network (RAN), can be inefficient and error-prone, due to rapidly varying data rate and delay. In these environments, the majority of TCP traffic is sent "downstream," from a serving host to a user device, with mostly acknowledgements (ACK) sent back "upstream." An intermediate platform, such as a Radio Network Controller (RNC) that sits on the communication path between a sender and the user device, represents a bottleneck node. The intermediate platform may have a high-capacity connection to the core network and Internet, and a limited bandwidth to a wireless base station and user device.

Exemplary embodiments of the present invention improve the performance of TCP in these kinds of environments by adjusting the advertised window sent upstream from the user device, based on estimates of capacity in the intermediate platform and the access network derived from observations of traffic travelling upstream of the intermediate service platform. Accordingly, the amount and rate of data sent downstream is improved while avoiding packet drops and subsequent retransmissions.

Exemplary embodiments may reside between the intermediate platform and core network, or within the RNC, monitoring and affecting traffic only on the core connection (IuPS, in 3GPP terminology). Accordingly, it may be unnecessary to deal with radio protocols in the access network.

Figure 1A:
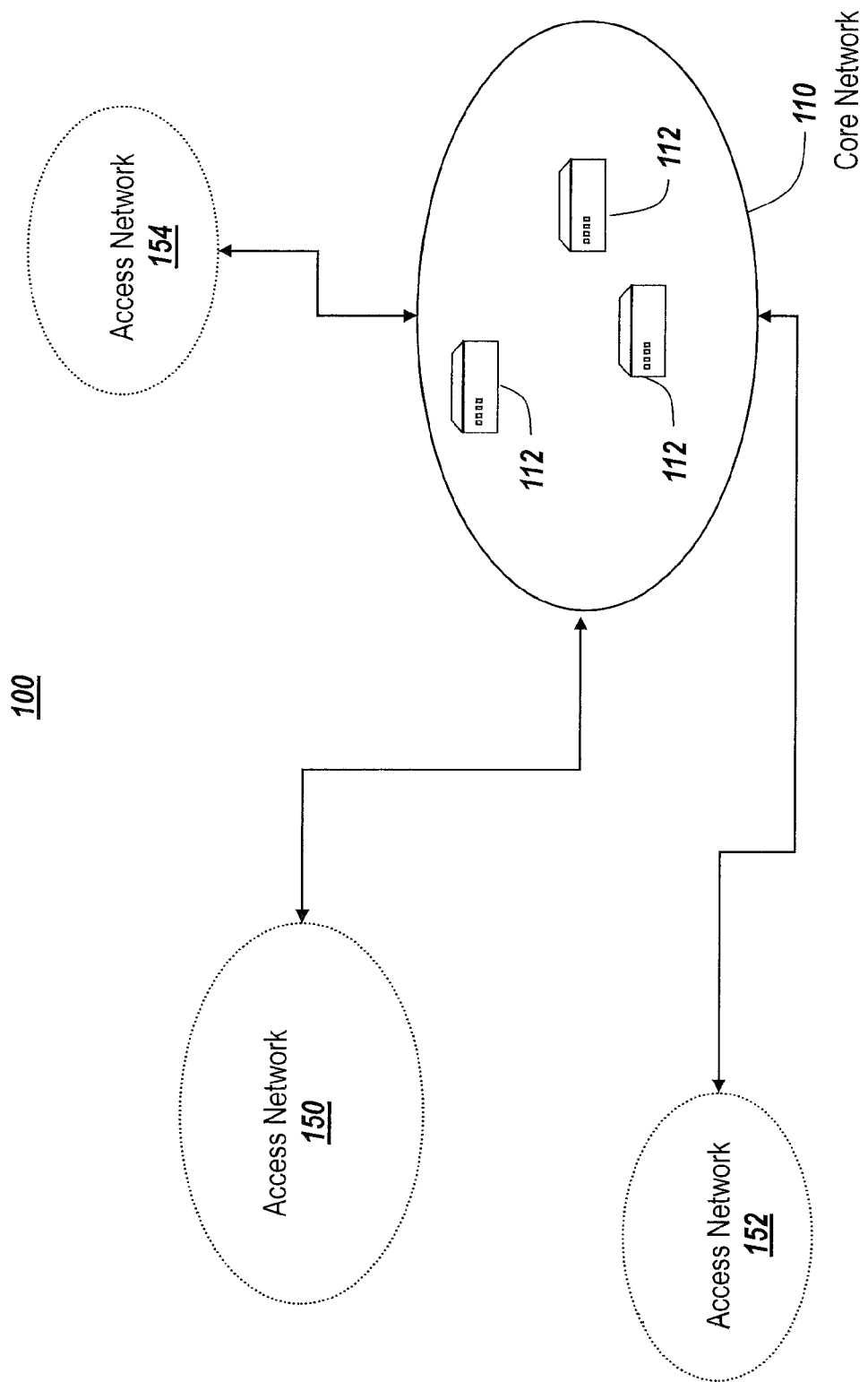
FIG. 1A depicts a communication network suitable for use in exemplary embodiments.

FIG. 1A depicts a communication network 100 suitable for use in exemplary embodiments. The communication network 100 may be a wireless network, or a wired network, or a combination or wireless and wired networks. The communication network 100 may be, for example, a Universal Mobile Telecommunications System (UMTS) network. For clarity, some exemplary embodiments are described herein with reference to a UMTS network. However, one skilled in the art will recognize that the functionality described herein is equally applicable in different types of communication networks, such as a network utilizing a WiFi framework, a UTRAN framework, a CDMA framework, a WiMax framework an LTE framework, or a UMB framework, among others.

The communication network may include a core network 110 and access networks 150, 152 and 154. Those skilled in the art will appreciate that the depiction of the communication network 100 in FIG. 1A is intended to be merely illustrative and not limiting. Other network configurations are possible in practicing the present invention. For example, the communication network may be fully distributed so as to have no core network, or may have more than one core network. The communication network may also have more or fewer access networks than the communication network 100 depicted in FIG. 1A. Some devices depicted in the communication network in the present figures may not be present in other communication networks, while other devices not depicted in the figures may be present.

The core network 110 may include one or more core services platforms 112. The core services platforms 112 may provide services within the core network, such as (but not limited to) fetching data from a storage repository or routing data throughout communications network 100. For example, the core services platform 112 may identify a location where requested content is stored. The core services platform 112 coordinates the retrieval of the requested content and the delivery of the requested content to the user device. A core services platform 112 can take a number of forms, depending on the services to be provided. For example, core services platforms 112 may be servers within core network 110. Alternatively, a core services platform 112 may be a switch, a router, a server (such as a file server or a mail server), a network bridge, a network hub, or a repeater.

Each access network 150, 152 and 154 serves as a point of contact with the communication network 100 for users, and connects subscribers with service providers. Examples of access networks include, but are not limited to, the UMTS Terrestrial Radio Access Network (UTRAN), the GSM Radio Access Network (GRAN), and the GSM Edge Radio Access Network (GERAN).

Figure 1B:
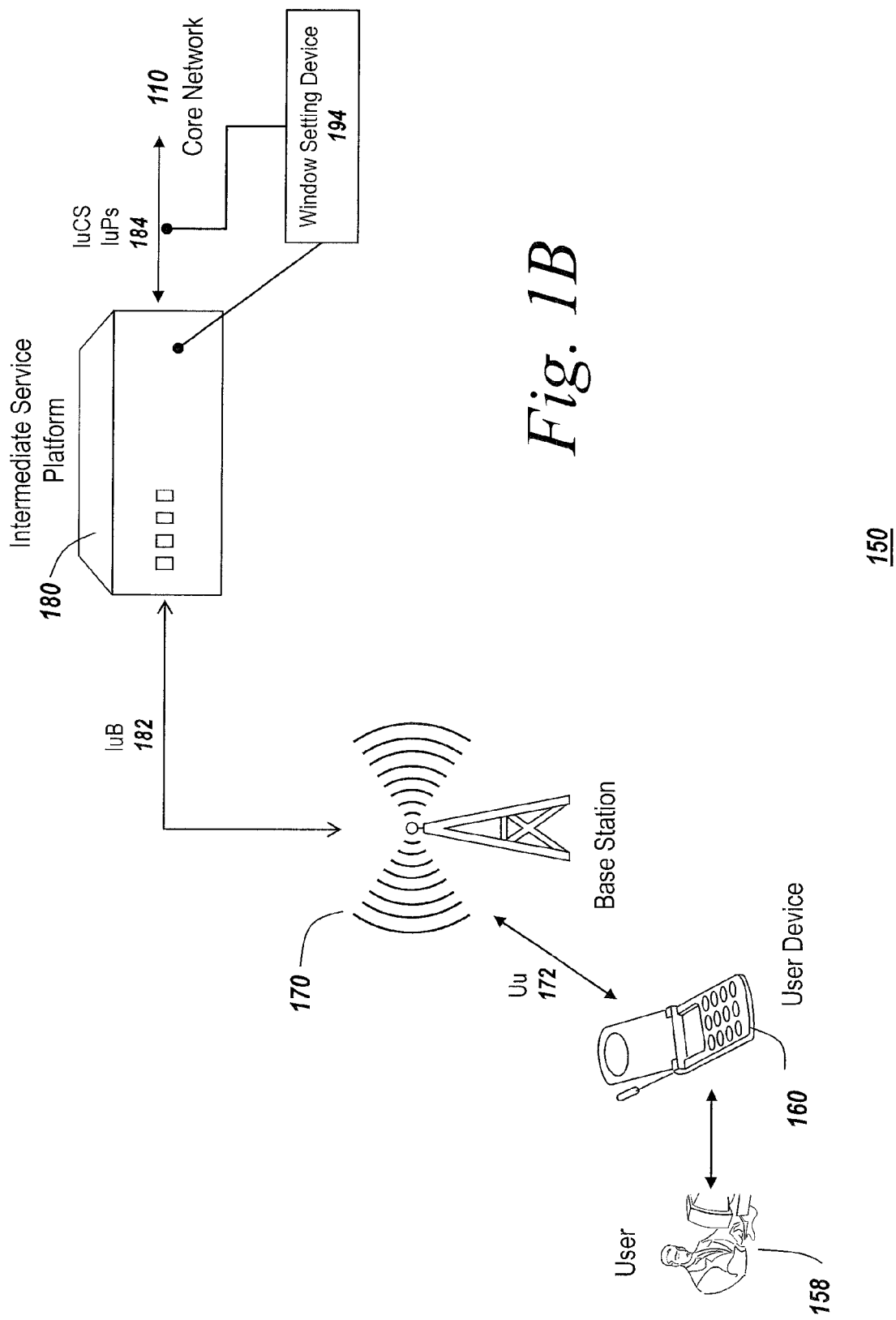
FIG. 1B depicts the access network 150 of FIG. 1A in more detail.

FIG. 1B depicts exemplary access network 150 in more detail. A user 158 using a user device 160 may interact with the access network 150 via a communications device, such as a modem, fiber optic connection, or a transmitter and receiver for radio communication. The user device 160 may be, for example, but is not limited to, a computing device, a personal digital assistant, a cellular phone, or a Global Positioning System device. The user device 160 may send and receive data through a base station 170 located in the access network 150. The base station 170 may be, for example, a gateway, a cell tower, a Node B, or an Enhanced Node B.

Any of the devices in the network 100 may send or receive data. Data includes information sent from one device to another in any format, including analog data, digital data, or a combination of analog and digital data. The data may be transmitted in discrete data packets, or in a non-packetized format, such as a continuous series of bytes, characters, or bits.

Data may be sent through the access network in multiple directions. For example, the data may be sent "downstream" or "upstream." As used herein, "downstream" in an access network refers to a direction of data flow in a data stream towards a base station in the access network (or, if present, towards a user device). As used herein, "upstream" in an access network refers to a direction of data flow towards the core network. Unless otherwise noted, procedures described herein as being performed on data traveling in one direction may also be employed on data traveling in the other direction.

Data in the access network 150 may originate, for example, at the user device 160 or the base station 170. Data may be directed from the base station 170 towards the core network 110. The base station 170 may interact with one or more intermediate service platforms 180 located in the access network 150 or may interact directly with the core network 110.

The intermediate service platforms 180 may perform tasks such as resource management (directing control of the network in a manner that allows the efficient use of network resources), filtering (inspecting incoming and outgoing data in order to remove extraneous, harmful, or harassing data), and routing (directing network traffic towards its appropriate destination). Examples of intermediate service platforms 180 include, but are not limited to, Radio Network Controllers, bridges, routers, and Virtual Private Network (VPN) servers.

One or more data channels may pass through the intermediate service platform 180, each data channel carrying one or more streams of data. Data channels or data streams in a network may be governed by one or more interfaces. An interface in the context of a data stream refers to a set of protocols or technical characteristics that describe the connection between two entities and/or govern the transmission of data in the data stream. Each of the data streams provided between two devices in a network may be governed by different interfaces. For example, in a UMTS network, the data stream 184 between the intermediate service platform 180 (a Radio Network Controller, or RNC, in one example) and a gateway device located before the core network 110 may be governed by the IuPS interface and/or the IuCS interface. The data stream 182 downstream of the intermediate service platform 180 may be governed by the IuB interface. Data may be sent from the user device 160 to the base station 170 via a Uu interface 172. Other examples of interfaces in the UMTS framework include the IuR interface, for signaling between two different RNCs. One of ordinary skill in the art will recognize that the above interfaces are provided merely as examples, and that the present invention may be applied to networks using any types of interfaces.

The user device 160 may send a request for data content to the network, and in doing so, may cause the base station 170 to start signaling the intermediate service platform 180 using an interface 182. Similarly, the core network may forward data to the access network, which may cause a device, such as a gateway device between the access network and the core network, to begin signaling the intermediate service platform 180 using an interface 184.

In the access network 150 of FIG. 1B, the intermediate service platform 180 represents a bottleneck node between the high-bandwidth IuPS connection 184 to the core (generally >100 Mb/s), and the lower-rate IuB connection 182 to the base station 170. Buffers are assigned in the intermediate service platform 180 on a per-user basis, to smooth the instantaneous rate variation between the IuPS connection 184 and the IuB connection 182. TCP's congestion avoidance mechanisms can serve to limit the average rate of a session to the bandwidth available to connect to the user device 160.

However, due to the rapidly-varying delay and data rate available in the access network 150 for each user 158, TCP may be inefficient, and under-utilize the available bandwidth. In particular, overflow of the buffer at the intermediate service platform 180 may cause dropped packets, triggering re-transmissions and reduction in the sending rate.

In order to address these and other issues, a window setting device 194 may be provided for setting an advertising window of the buffer present in the intermediate service platform 180. As noted in FIG. 1B, The window setting device 194 may be located upstream of the intermediate service platform 180 on the IuPS interface 184 (i.e., the high-bandwidth side of the intermediate service platform 180), or may be collocated with the intermediate service platform 180. In one embodiment, the window setting device 194 is provided as part of the functionality of the intermediate service platform 180. In certain embodiments, the window setting device 194 sets the size of the advertised window based on measurements of network traffic on the high-bandwidth side (i.e., IuPS interface 184) of the intermediate service platform 180 without directly querying for a size of the buffer in the intermediate service platform 180. To accomplish this, the window setting device 194 may be capable of monitoring traffic on the high-bandwidth or upstream side of the intermediate service platform 180.

In some embodiments, the intermediate service platform 180 represents a bottleneck node in the access network 150. The window setting device 194 may reside between the bottleneck node and a source of data, such as a TCP source. In some embodiments pertaining to a wireless communication network, the window setting device may monitor high speed Downlink Shared Channel (HS-DSCH) capacity allocation frames, and thereby receive regular updates of the buffer fill level of data flows from the intermediate service platform 180. The window setting device 194 can also view data traffic in both directions on the IuPS interface 184 on the core-network side of the intermediate service platform 180, including monitoring per-TCP session data segments and acknowledgements (ACKs). In some embodiments, the window setting device 194 may be unaware of the intermediate service platform 180 buffer capacities. Multiple TCP flows may be contained in a single intermediate service platform 180 buffer.

Figure 2A:
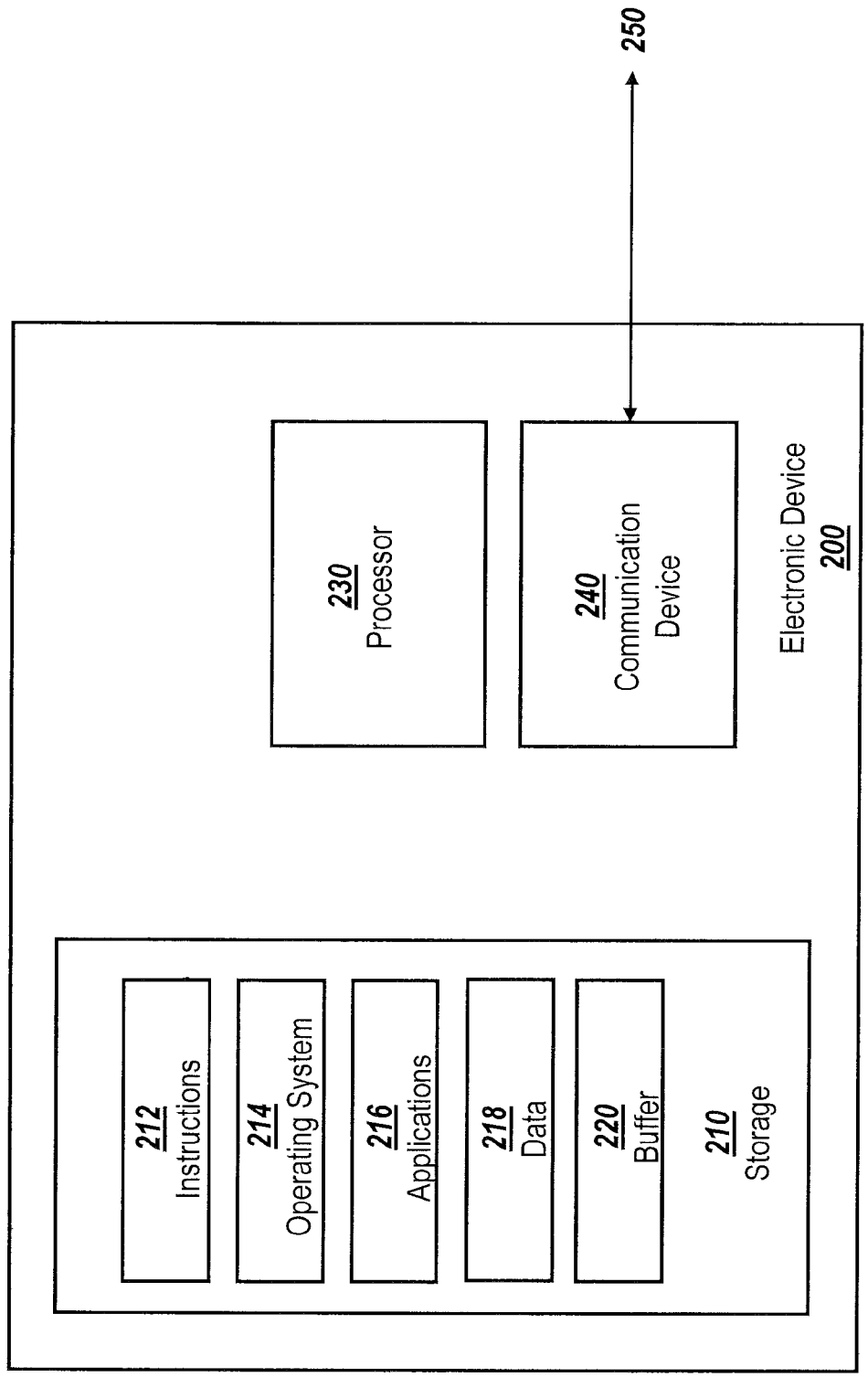
FIG. 2A depicts an electronic device 200 suitable for use in exemplary embodiments.

The user device 160, the intermediate service platform 180, and the window setting device 194, among other devices, may be electronic devices such as the electronic device 200 depicted in FIG. 2A.

The electronic device 200 may contain a storage 210 for storing instructions 212 to be executed by one or more processors 220, such as a microprocessor, ASIC, FPGA, or a controller. The storage 210, may be, for example, on one or more non-transitory electronic device readable storage media. Examples of electronic device-readable storage media include, but are not limited to, RAM, ROM, magnetic storage media, or optical storage media, such as CDs or DVDs.

Figure 3:
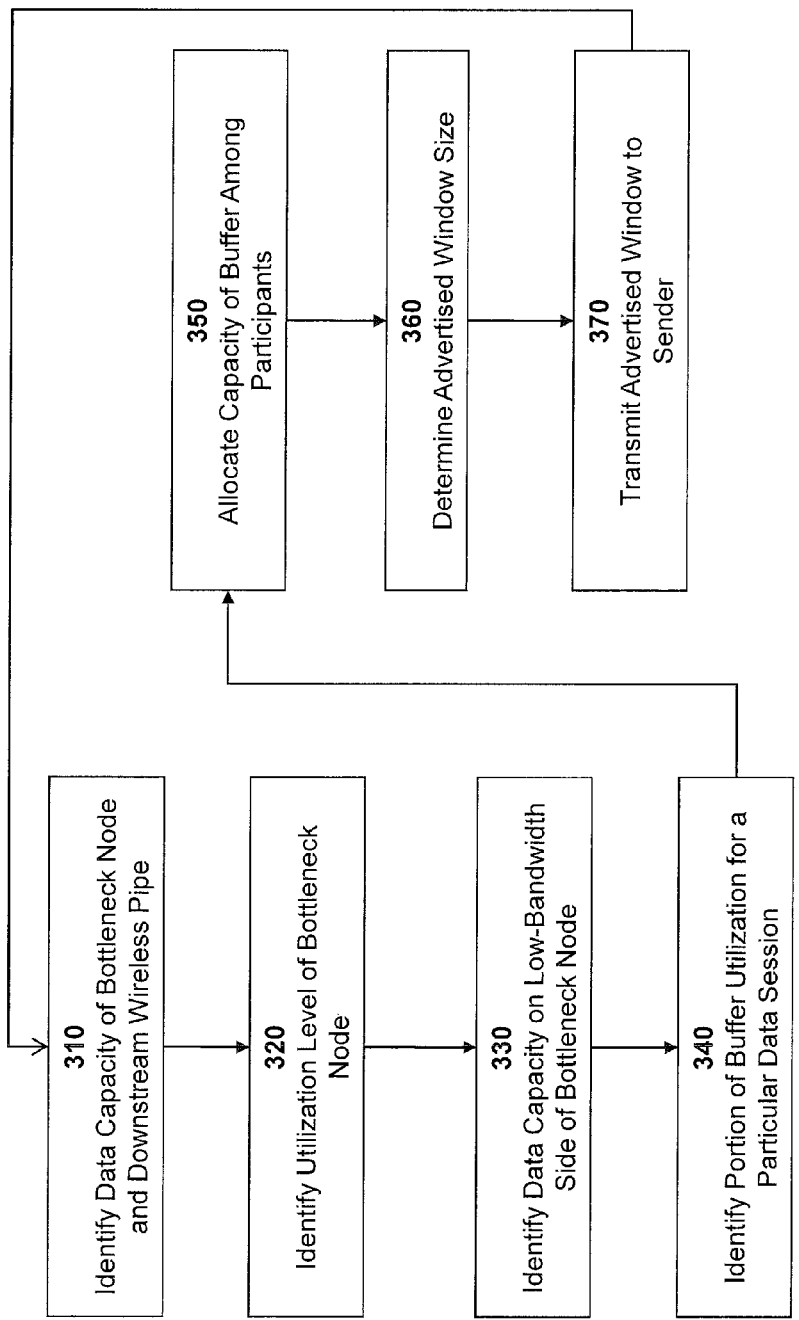
FIG. 3 is a flowchart depicting an exemplary procedure performed by an electronic device for calculating and setting an acknowledgement window size.

Instructions 212 may cause the processor 220 to perform a series of steps described in detail herein with respect to FIG. 3. The instructions 212 may be in any form that describes how to perform these steps. For example, the instructions may be uncompiled code in any suitable programming language, compiled code, assembly language instructions, or any other type of instructions.

The storage 210 may also store an operating system 214 for operating the electronic device 200. The storage 210 may store additional applications 216 for providing additional functionality, as well as data 218 for use by the electronic device 200 or another device. Additionally, the electronic device 200 may maintain a buffer 220 for temporarily storing data, such as in the case of an intermediate service platform 180 that temporarily stores data that passes through the intermediate service platform 180 as the data is transmitted from a sender (which may be located, for example, in the core network 110) to a user device 160. The buffer 220 will be described in more detail with respect to FIG. 2B, below.

The electronic device 200 may have a communication device 230 for communicating with a communication network 250. The communication device 230 may be, for example, a modem, an Ethernet connection, a fiber optic connection, a radio antenna, or any suitable means for communicating with a network. The electronic device 200 may proxy a transport protocol in an access network. For example, if the network is a UMTS network, the electronic device 200 may proxy an IuB or an IuPS protocol. However, the present disclosure is not limited to implementation in a UMTS network, and may be deployed in any suitable communication network. The transport protocol employed will vary based on the type of communication network utilized.

Figure 2B:
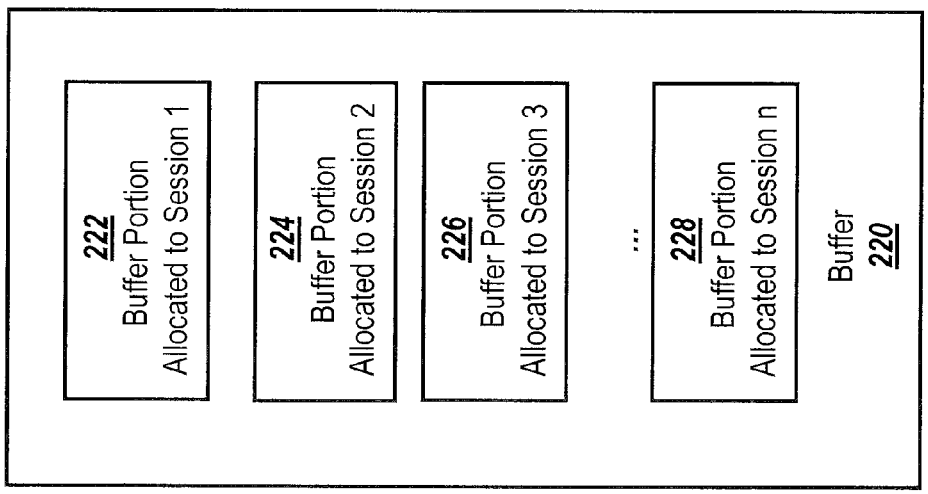
FIG. 2B depicts an exemplary buffer 220 of FIG. 2A in more detail.

As noted above, the electronic device 200 may include a buffer 220 for temporarily storing data. FIG. 2B depicts an exemplary buffer 220 of FIG. 2A in more detail.

The buffer 220 may be subdivided into n parts. The subdivision may be, for example, a logical subdivision defining logical boundaries between memory locations. Each of the subdivisions 222, 224, 226, 228 may be allocated to a different entity. For example, in some embodiments, the intermediate service platform 180 may handle n different TCP sessions, and each TCP session may be assigned a portion of the buffer 220. In other embodiments, each user 158 may be allocated a portion of the buffer 220.

Figure 2C:
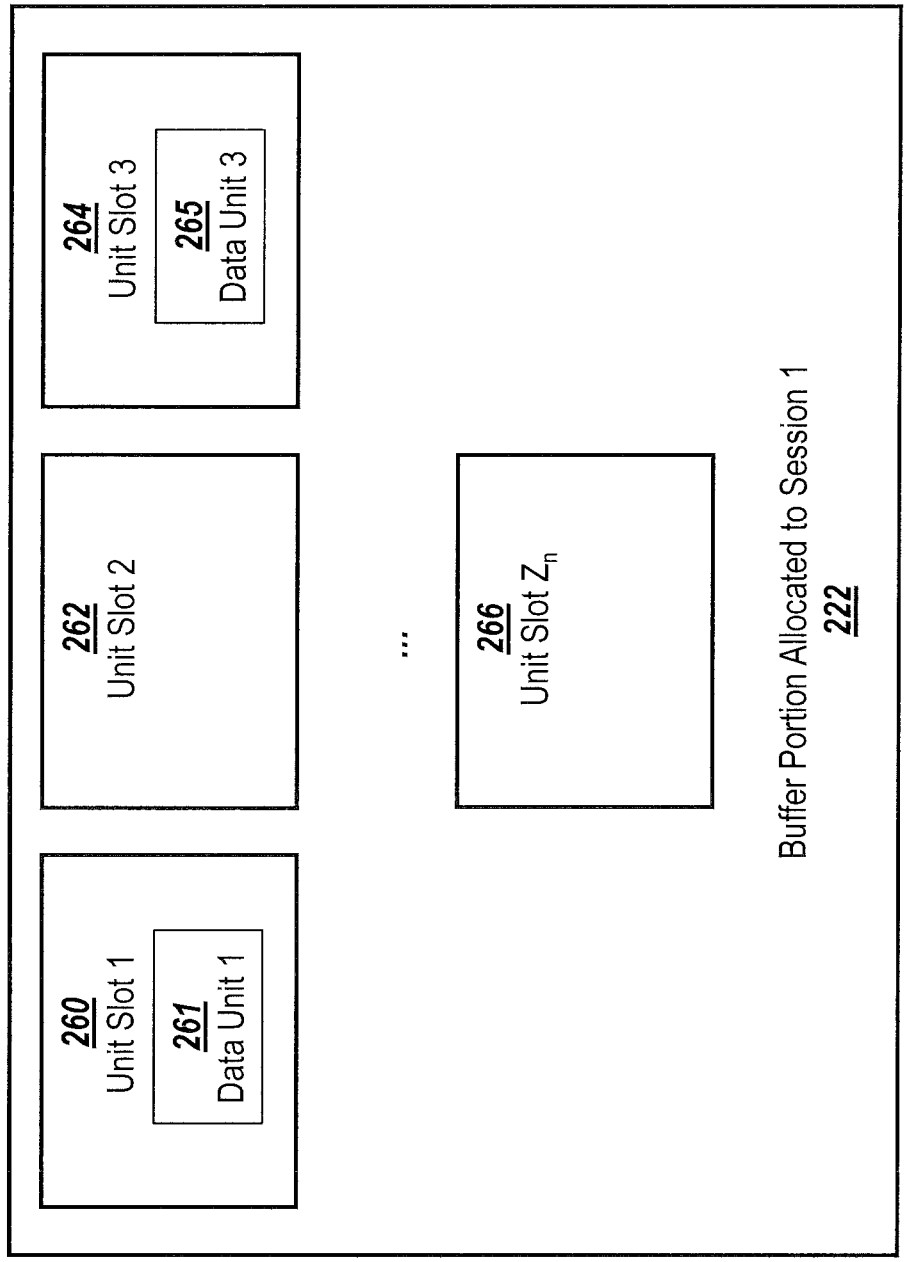
FIG. 2C depicts an exemplary portion of the buffer 220 of FIG. 2B in more detail.

Each portion 222, 224, 226, 228 of the buffer 220 may be further subdivided as shown in FIG. 2C. For example, the buffer portion 222 may be divided into $Z_n$ unit slots 260, 262, 264, 266. Each unit slot 260, 262, 264, 266 may be capable of storing a unit of data, such as a data packet or a byte of data.

As data is transmitted in the access network 150, the data may be buffered in a portion of the buffer 220, depending on the TCP session the data is assigned, the identity of a sender and/or receiver, etc. The transmitted units of data may be assigned a sequence number, and data may be assigned to a unit slot in the buffer 220 depending on the sequence number.

In the example depicted in FIG. 2C, a portion 222 of the buffer 220 is assigned to TCP session #1. In this case, a data unit 261 having the sequence number 1 has been received, and placed into the buffer portion 222 in the first unit slot 260. In addition, a data unit 265 having the sequence number 3 has been received and placed into the buffer portion 222 in the third unit slot 264. In this example, data having the sequence number 2 has not yet been received at the electronic device 200. This could be because Data Unit 2 was lost during transmission or delayed, for example due to traffic in the communications network 100. If an acknowledgement of receipt of Data Unit 2 is not received by the sender after a predetermined period of time, the sender may retransmit Data Unit 2.

The unit slots that are present in any given portion of the buffer 220 represents the amount of data that can be processed at the bottleneck node for the entity (TCP connection, user, etc) that is assigned to that portion of the buffer 220. Because the buffer 220 portions represent a bottleneck on the communications path between the sender and the receiver, exemplary embodiments described herein provide an efficient means for controlling the rate of data sent through the bottleneck node by modifying the advertised window for the receiver. FIG. 3 is a flowchart depicting an exemplary procedure performed by an electronic device in a communications network for calculating and setting the advertised window size.

The communications network may include a core network and an access network which connects one or more user devices to the core network.

At step 310, a use level of the bottleneck node and at least a portion of the access network may be estimated. This estimation may be made based on an observation of traffic on the high-bandwidth side of the bottleneck node.

The bottleneck node may be a device in the access network that interacts with the network through a high-bandwidth side and a low-bandwidth side, and data may pass through the bottleneck node on the way to a receiving electronic device, such as a user device. The high-bandwidth side of the bottleneck node may represent a connection between the core network and the access network.

In one embodiment, the advertised window may be a TCP advertised window. The connection between the core network and the access network may be an IuPS connection. The access network may be a Radio Access Network (RAN), and the bottleneck node may be an intermediate service platform in the access network, such as a Radio Network Controller.

In a preferred embodiment, the use level of the bottleneck node and at least a portion of the access network represents a use level of a buffer 220 of the bottleneck node combined with a use level of the wireless network on the downstream side of the bottleneck node between the bottleneck node and the user device 160. This downstream side may be referred to as the downstream wireless pipe.

For example, assume that a given user is associated with N TCP sessions, each TCP session representing a data flow i. For each TCP session, i, for a given user, step 310 may involve monitoring the current downstream segment sequence value $SEQ\_NO_i$, and the upstream acknowledgement sequence number $ACK\_NO_i$. This information may be determined based on an observation of traffic travelling upstream from the bottleneck node (e.g., traffic on the high-bandwidth side of the bottleneck node, between the bottleneck node and the core network, such as the IuPS interface). The total number of bytes $Z_i$ contained in the bottleneck node buffer and downstream wireless pipe Y for flow i may be represented as:

$$Z_i = SEQ\_NO_i - ACK\_NO_i \qquad (1)$$

In other words, the total number of bytes for a given TCP session can be thought of as the difference between the most recent sequence number of the data unit sent to the receiving electronic device, and the sequence number that was most recently acknowledged as being delivered to the receiving electronic device. Conceptually, this total number of bytes for flow i represents the number of bytes that are in transit between the bottleneck node and the receiving electronic device for the flow i.

The total number of bytes in the bottleneck node buffer and downstream wireless pipe for the user is given as:

$$Z = \Sigma_{i=1}^{N}(SEQ\_NO_i - ACK\_NO_i) \qquad (2)$$

This total number of bytes in the bottleneck node buffer and the downstream wireless pipe may represent the use level of the bottleneck node and at least a portion of the access network.

At step 320, a utilization level (UBS) of the bottleneck node may be identified. Although the window setting device may not be capable of querying for the size of the buffer in the bottleneck node directly, the window setting device may still be capable of determining a level of utilization of the buffer. For example, if the window setting device is able to observe traffic on the IuPS interface, the window setting device may be able to monitor HS-DSCH capability allocation frames on the IuPS interface. These frames may provide regular updates of the buffer fill level of each MAC-d (RLC bearer) flow from the bottleneck node. In this way, the UBS value may be determined for a given user.

At step 330, a use level (e.g., an amount of traffic) on the low-bandwidth side of the bottleneck node maybe determined. Step 330 may make use of the information determined at steps 310 and 330. For example, equation (2) above defines the total number of bytes Z in the bottleneck node buffer and downstream wireless pipe Y for the user. And step 330 defined the utilization level (UBS) of the bottleneck node. The amount of traffic Y on the low-bandwidth (downstream) side of the bottleneck node may therefore be given as:

$$Y = Z - UBS \qquad (3)$$

At step 340, a portion of buffer utilization for a particular data session i may be identified. Equation (1) provides a value for $Z_i$, the total number of bytes contained in the bottleneck node buffer and downstream wireless pipe Y for flow i. Equation (2) provides a value for Z, the total number of bytes contained in the bottleneck node buffer and downstream wireless pipe Y for a given user. The proportion of the UBS occupied by TCP session i can be estimated as $(Z_i/Z)*UBS$. The number of bytes of session i contained in the downstream wireless pipe as the difference between Zi and the number of bytes in session i stored in the RNC buffer:

$$Y_i = Z_i - (Z_i/Z)*UBS \qquad (4)$$

At step 350, the capacity of the buffer may be allocated among different participants. For example, participants might be receiving electronic devices, and/or different data flows for individual receivers, such as different TCP sessions. In one embodiment, a portion of the buffer may be assigned to a particular TCP session for a particular receiving electronic device.

One way to allocate buffer capacity B is to estimate the size of the buffer available to a particular receiving electronic device, and then divide the buffer size into equal portions for each of the data flows associated with the receiving electronic device. For example, if there are N data flows for a particular receiving electronic device, then each data flow may be assigned a portion of the buffer $B_i = B/N$.

The value of B may be determined, for example, based on knowledge of the construction of the bottleneck node or knowledge of common network practices. For example, a common value for B is 64 KB. Alternatively, the value of B may be estimated, or different values of B may be selected until improved network performance results.

One potential issue with such a proportional assignment is that the access network capacity may be underutilized. For example, if four TCP sessions are active for a user, but only one is communicating nearly all of the data, then the single most active TCP session will be assigned only one-fourth of the capacity of the buffer. This issue can become more problematic as the number of flows increases.

One way to mitigate this issue is to assign a maximum value for N, $N_{max}$. $N_{max}$ may be chosen, for example based on network simulations, trial and error, or an estimate of the typical number of flows present in a given access network. In this situation, each data flow may be assigned a portion of the buffer $B_i = B/N_{max}$.

In another embodiment, the capacity of the buffer may be allocated among the participants based on a proportional session capacity of a data flow for each of a plurality of receiving electronic devices. In this embodiment, the capacity of the buffer is allocated based on an estimate of the proportion of the data that is present in the downstream wireless pipe and the buffer of the bottleneck node. For example, the portion of the buffer B, assigned to data flow i may be set at $B_i = (Z_i/Z)*B$.

In the preferred embodiment, these approaches are combined, as shown in equation (5) below:

$$B_i = \max(B/N, B/N_{max}, (Z_i/Z)*B) \quad (5)$$

It will be noted that, by allocating buffer capacity according to Equation (5), there is some risk that the buffer of the bottleneck node will be overallocated. However, by allocating buffer capacity according to Equation (5), there is a reduced change of under-utilizing capacity in the access network. Equation (5) also provides a minimum limit to the size of the buffer space that is allocated to each data flow, in order to avoid the possibility that an initial data flow blocks successive data flows by using all or most of the available buffer capacity.

At step 360, an advertised window size is determined. The advertised window size may control the rate of the data so that data units transmitted to the buffer of the bottleneck node do not cause the buffer to overflow, and yet may also take into account the amount of data that may be present in the downstream wireless pipe en route to the receiving electronic device. In the preferred embodiment, the advertised window size Wi for a particular data flow i uses the results of Equations (4) and (5):

$$W_i = B_i + Y_i \quad (6)$$

At step 370, the advertised window may be transmitted to the sender in order to inform the sender how many units of data the sender is permitted to transmit at any given time (e.g., before an acknowledgement has been received for at least some of the units of data). This may be accomplished, for example, by setting or modifying the value of $W_i$ that is assigned to each ACK as it is paced out onto the high-bandwidth side of the bottleneck node.

As noted above, the window setting device 194 may be unable to directly query for the precise capacity of the intermediate service platform 180 buffer 220. Nonetheless, using the techniques described above, the window setting device 194 can set an advertised window and buffer allocation in a way that efficiently utilizes the bandwidth of the access network 150 without causing buffer overflow and data loss, even in the case (as above) where multiple TCP sessions share a single buffer.

Although the above description has been given with specific examples from a mobile network, one having ordinary skill in the art will recognize that the present invention is not so limited, and may be applied in any type of network.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the invention, and exclusive use of all modifications that come within the scope of the appended claims is reserved. It is intended that the present invention be limited only to the extent required by the appended claims and the applicable rules of law.

The invention claimed is:

1. A non-transitory computer-readable storage medium having stored thereon instructions that are executable by one or more processors, and cause the one or more processors to set a size of an advertised window for a receiving electronic device that receives data from a sender in a communications network, the communications network comprising a core network, an access network, and a bottleneck node interacting with the communications network through a first connection between the bottleneck node and the core network and a second connection between the bottleneck node and the access network or the receiving electronic device, the bottleneck node having a buffer for temporarily storing the data passing through the bottleneck node from the sender to the receiving electronic device, the instructions comprising instructions for:
   determining a first use level of the bottleneck node and at least a portion of the access network representing a second use level of the buffer combined with a third use level of the second connection, the second and third use levels being based in part on a comparison of a downstream sequence number and an upstream acknowledgement sequence number;
   determining an advertised window size using the determined first use level, the advertised window size representing an amount of data that the sender is permitted to transmit to the receiving electronic device during a predetermined time period; and
   setting a size of the advertised window for the receiving electronic device to the determined advertised window size.

2. The medium of claim 1, wherein at least a portion of the buffer is assigned to the receiving electronic device, and the portion is further subdivided into subportions for a plurality of data flows of the receiving electronic device.

3. The medium of claim 2, wherein the advertised window size is determined using a combination of the first use level and a fourth use level of the second connection.

4. The medium of claim 2, wherein the advertised window is further determined using an overall use level of the buffer.

5. The medium of claim 2, further having stored thereon instructions for allocating a capacity of the buffer among the plurality of receivers using a proportional session capacity of a data flow for each of the plurality of receivers.

6. The medium of claim 1, wherein the advertised window is a Transmission Control Protocol (TCP) advertised window.

7. The medium of claim 1, wherein the access network connects one or more receiving electronic devices to the core network via the bottleneck node.

8. The medium of claim 7, wherein the first connection between the core network and the bottleneck node is an IuPS connection.

9. The medium of claim 7, wherein the access network is a Radio Access Network (RAN).

10. The medium of claim 7, wherein the bottleneck node is an intermediate service platform in the access network.

11. The medium of claim 10, wherein the bottleneck node is a Radio Network Controller (RNC).

12. The medium of claim 1, wherein the first use level is determined without directly querying for a size of the buffer.

13. An computer-implemented method for setting a size of an advertised window for a receiving electronic device that receives data from a sender in a communications network, the communications network comprising a core network, an access network, and a bottleneck node interacting with the communications network through a first connection between the bottleneck node and the core network and a second connection between the bottleneck node and the access network or the receiving electronic device, the bottleneck node having a buffer for temporarily storing the data passing through the bottleneck node from the sender to the receiving electronic device, the method comprising:
  determining a first use level of the bottleneck node and at least a portion of the access network representing a second use level of the buffer combined with a third use level of the second connection, the second and third use levels being based in part on a comparison of a downstream sequence number and an upstream acknowledgement sequence number;
  determining an advertised window size using the determined first use level, the advertised window size representing an amount of data that the sender is permitted to transmit to the receiving electronic device at a given time; and
  setting a size of the advertised window for the receiving electronic device to the determined advertised window size.

14. The method of claim 13, wherein at least a portion of the buffer is assigned to the receiving electronic device, and the portion is further subdivided into subportions for a plurality of data flows of the receiving electronic device.

15. The method of claim 14, wherein the advertised window size is determined using a combination of the first use level and a fourth use level of the second connection.

16. The method of claim 14, wherein the advertised window is further determined using an overall utilization of the buffer in the bottleneck node.

17. The method of claim 14, further comprising allocating a capacity of the buffer among the plurality of receivers using a proportional session capacity of a data flow for each of the plurality of receivers.

18. A system for setting a size of an advertised window for a receiving electronic device that receives data from a sender in a communications network, the communications network comprising a core network, an access network, and a bottleneck node interacting with the communications network through a first connection between the bottleneck node and the core network and a second connection between the bottleneck node and the access network or the receiving electronic device, the bottleneck node having a buffer for temporarily storing the data passing through the bottleneck node from the sender to the receiving electronic device, the system comprising:
  a storage for storing an advertised window size representing an amount of data that the sender is permitted to transmit to the receiving electronic device during a predetermined time period; and
  one or more processors configured to:
    determine a first use level of the bottleneck node and at least a portion of the access network representing a second use level of the buffer combined with a third use level of the second connection, the second and third use levels being based in part on a comparison of a downstream sequence number and an upstream acknowledgement sequence number;
    determine the advertised window size using the determined first use level; and
    set a size of the advertised window for the receiving electronic device to the determined advertised window size.

19. The system of claim 18, wherein the bottleneck node is a Radio Network Controller (RNC) in the access network.

20. The system of claim 19, wherein the one or more processors reside between the RNC and the core network.

21. The system of claim 19, wherein the system is collocated with the RNC.

22. The system of claim 18, wherein the one or more processors are unaware of a buffer capacity of a buffer represented in the second use level.

* * * * *